(12) United States Patent
Morici

(10) Patent No.: US 8,561,654 B2
(45) Date of Patent: Oct. 22, 2013

(54) SELF PROPELLED KIT APPLICABLE TO BUCKRAKING MACHINES OR SILO-BAG

(75) Inventor: Sabrina Morici, Santa Fe (AR)

(73) Assignees: Sabrina Morici, Santa Fe (AR), Part Interest; Oscar Alfredo Mamarella, Santa Fe (AR), Part Interest ( * ) Notice: Subject to any disclaimer, the term of this patent is extended or adjusted under 35 U.S.C. 154(b) by 1260 days.

(21) Appl. No.: 12/401,672

(22) Filed: Mar. 11, 2009

(65) Prior Publication Data

US 2010/0229518 A1 Sep. 16, 2010

(51) Int. Cl.
*B65B 1/20* (2006.01)
*B65B 3/16* (2006.01)
*B65B 3/18* (2006.01)

(52) U.S. Cl.
USPC .......... 141/73; 141/114; 141/231; 74/16; 198/506; 198/510.1

(58) Field of Classification Search
USPC .......... 141/231, 71, 73, 74; 56/11.7; 198/513; 414/403, 404
See application file for complete search history.

(56) References Cited

U.S. PATENT DOCUMENTS

| | | | | |
|---|---|---|---|---|
| 4,420,119 A * | 12/1983 | Johnson | ......... | 241/101.71 |
| 5,697,249 A * | 12/1997 | Miguchi | ......... | 74/16 |
| 7,237,576 B1 * | 7/2007 | Cullen | ......... | 141/71 |
| 7,261,129 B2 * | 8/2007 | Koelker | ......... | 141/73 |
| 7,802,956 B2 * | 9/2010 | Schertz et al. | ......... | 414/403 |
| 7,861,851 B2 * | 1/2011 | Dekoning | ......... | 198/513 |
| 8,251,630 B2 * | 8/2012 | Hilsabeck et al. | ......... | 414/412 |
| 8,336,704 B2 * | 12/2012 | Dekoning | ......... | 198/513 |

* cited by examiner

*Primary Examiner* — Timothy L Maust
*Assistant Examiner* — Brandon J Warner
(74) *Attorney, Agent, or Firm* — Defillo & Associates, Inc.; Evelyn A. Defilló

(57) ABSTRACT

The present invention relates to a kit which can be easily adapted to a buckraking device or silo-bag, to allow people to work without using a tractor. The kit includes a movable base having at least one wheel and an independent engine mounted on the movable base. The independent engine activates the load screw and a clutch mechanism is coupled to the independent engine. A coupling fuse is coupled to the clutch mechanism and a speed reducer is coupled to the coupling fuse. A short cardan joint is coupled to the speed reducer at one end and to the hopper in the other end.

6 Claims, 3 Drawing Sheets

SELF PROPELLED KIT APPLICABLE TO BUCKRAKING MACHINES OR SILO-BAG

TECHNICAL FIELD

The present invention relates to a self-propelled kit applicable to agricultural buckraking devices or silo-bags, the type which is utilized for grain storage in fields, and which includes a reception hopper, a filling tunnel, a worm gear or load screw for the filling of the connected bag.

BACKGROUND OF THE INVENTION

Grain buckraking devices that are currently known are those which carry out the grain storage, dependent on the use of a tractor or a similar vehicle. This vehicle is connected to the machine at the moment of working and through a transmission or cardan joint, which receives the tractor command, gives movement to the worm gear through the force bar, and control of the advance direction through its steering wheel and wheels.

It should be clear that it is not possible to carry out grain silages without a tractor or the like, since neither the worm gear would be moved nor would it allow the buckraking device to advance in the desired direction. The great disadvantage which arises with the need to use a tractor is that it cannot be used for other important tasks such as silage, generating delays as a consequence. If we imagine a field where people are silaging in four different areas, basically we would need four tractors to carry out grain storage simultaneously and those tractors would be unavailable to carry out other tasks.

While it is working, the grain will get into the upper reception hopper of the buckrake from the self-unloading part in order to be taken by the grain load's worm gear that will make the grain enter into the bag. As a consequence, the bag will be gradually filled with grains and, because of the pressure on a deflection torque that is in the buckrake, a drive forward will be produced. In that way, the whole equipment will move forward, and its direction will be controlled by the tractor's direction. It is important to think of the energy and fuel that is going to be consumed in moving the tractor and the activation of the worm gear.

SUMMARY OF THE INVENTION

The present invention comprises a kit which can be easily adapted to any buckrake in the market, and allows people to work without using the tractor, leaving it for other tasks.

The kit of the present invention is applicable to a buckraking device or silo-bag, wherein the buckraking device includes a reception hopper, a filling tunnel, a worm gear or load screw for the fitting of the bag storage, and a work spear. The self-propelled kit comprises:
a movable base having at least one wheel;
an independent engine mounted on the movable base, wherein the independent engine activates the worm gear or load screw;
a clutch mechanism coupled to the independent engine;
a coupling fuse coupled to the clutch mechanism;
a speed reducer coupled to the coupling fuse; and
a short cardan joint coupled to the speed reducer at one end and to the hopper at the other end.

It is known in the art to use buckraking devices that do not use tractors and where the grain is loaded into the silo-bag by gravity. Those machines do not obtain successful grain storage and result in totally discarded grains with low specific gravity. Therefore, the result is a low percentage of bag storage and waste of the bag's volume.

The present set of elements guarantees a total and effective storage of bags, permits its use with any dry grain, replaces the use of the tractor, attaining the worm gear's movement and self-propulsion through a 13 HP engine, a hydraulic automatic clutch, a coupling fuse, a speed reducer gear, and a short cardan joint. Likewise, a much softer, uniform and without vibrations bag storage is obtained, since the transmission cardan joint was shortened.

In regards to the engine being used, it can be a gasoline engine, a diesel, a CNG (compressed natural gas) engine or an electric one. The latter has important limitations because in places where bag storage takes place, generally there is no electric current. Preferably, the clutch should be hydraulic automatic, but it can be replaced by a mechanical one.

The directional wheel of the buckraking device will be constituted by a wheel made of a disc-shaped central sheet with two cylindrical bodies as wheels by each side. The previously mentioned disc will stick in the ground and it will allow the machine to be directed in all types of land. The cylindrical bodies will include wings for a better adherence to the ground.

The buckraking device of present disclosure may allow to fill the silo-bags in all types of land, like mud, high pasture, even with water on the ground, and at the same time, the movement from one field to another by wagon.

DESCRIPTION OF THE DRAWINGS

In order to make the objective of the present invention more intelligible, it has been illustrated with schematic Figures, in their preferred embodiment thereof, which assumes a demonstrative example in them.

As extra information, the same Figure references correspond with the same elements of the invention.

DETAILED DESCRIPTION OF THE INVENTION

Figure 1:
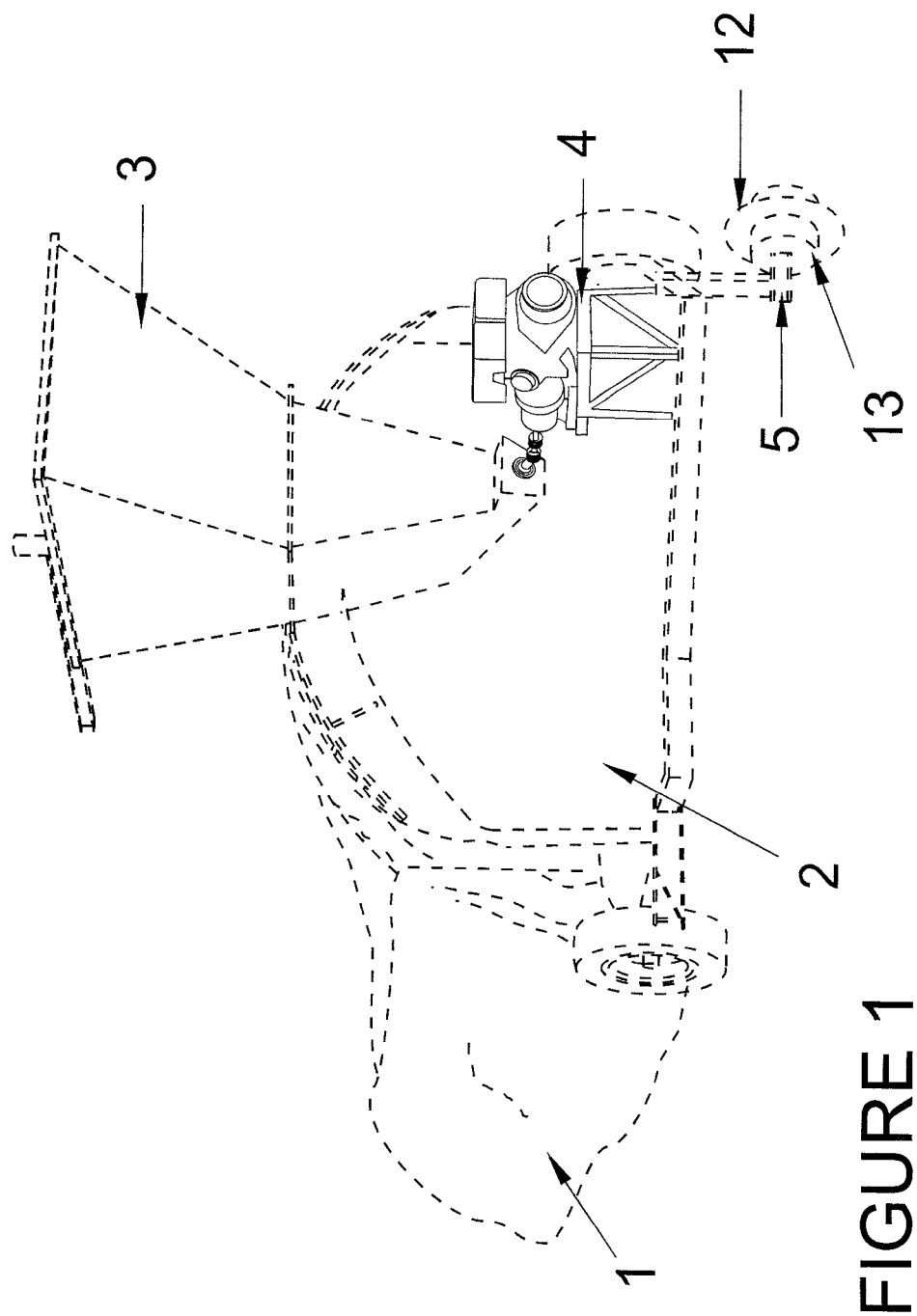
FIG. 1 illustrates a frontal perspective view of the buckraking device in which the present invention's kit was applied.

In FIG. 1 it can be observed an agricultural buckrake with its corresponding bag or silo-bag 1, fitted to the filling tunnel 2, the reception hopper 3, the activation engine 4 of the worm gear, and the direction wheel 5. It can be seen in the direction wheel 5, the central disc 12 and the cylindrical bodies 13 in each of the two lateral sides.

Hold wings may be placed perpendicular to the surface of rotation of the cylindrical bodies 13.

Figure 2:
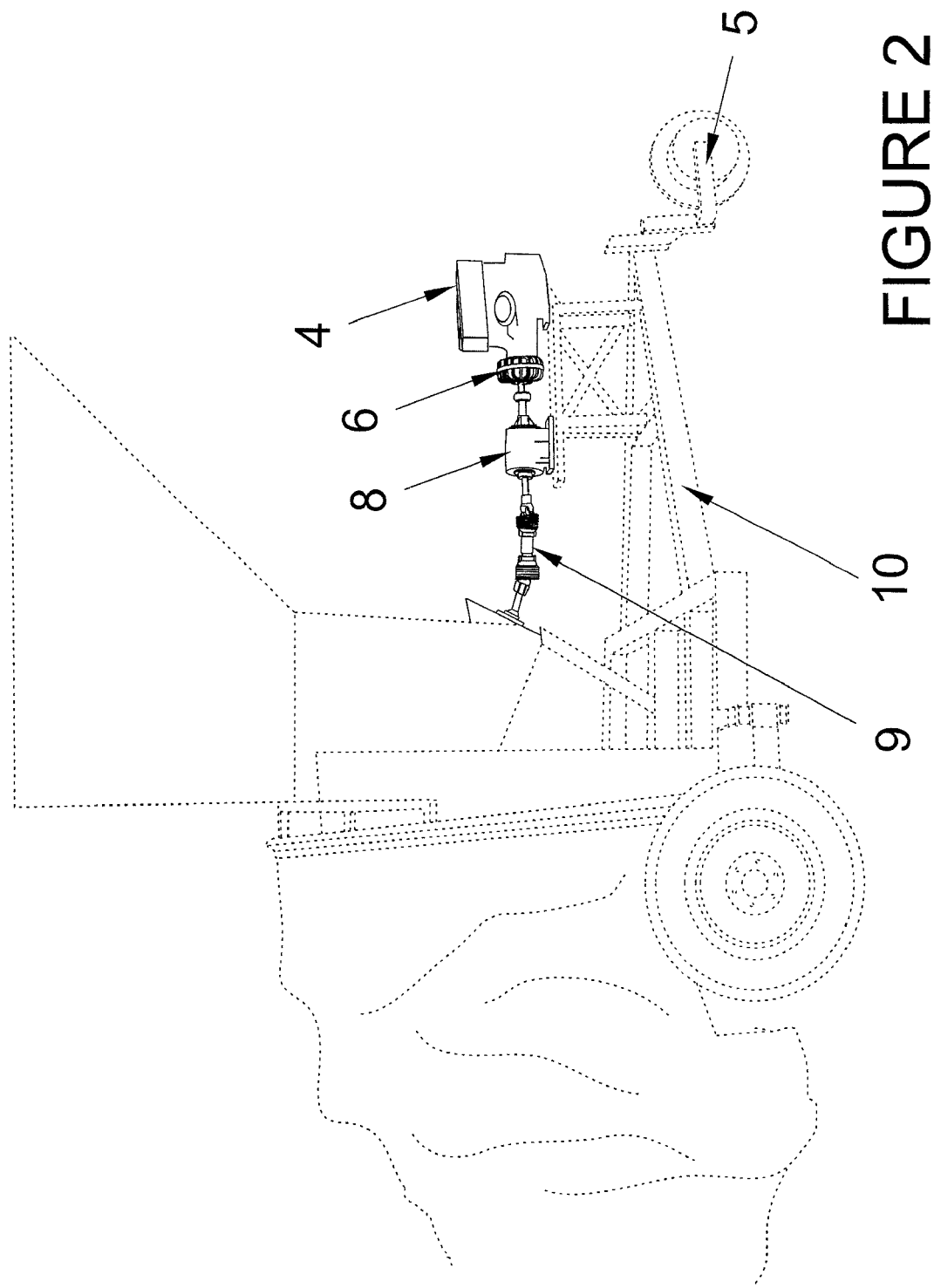
FIG. 2 illustrates a lateral view of the buckraking device of FIG. 1.
Figure 3:
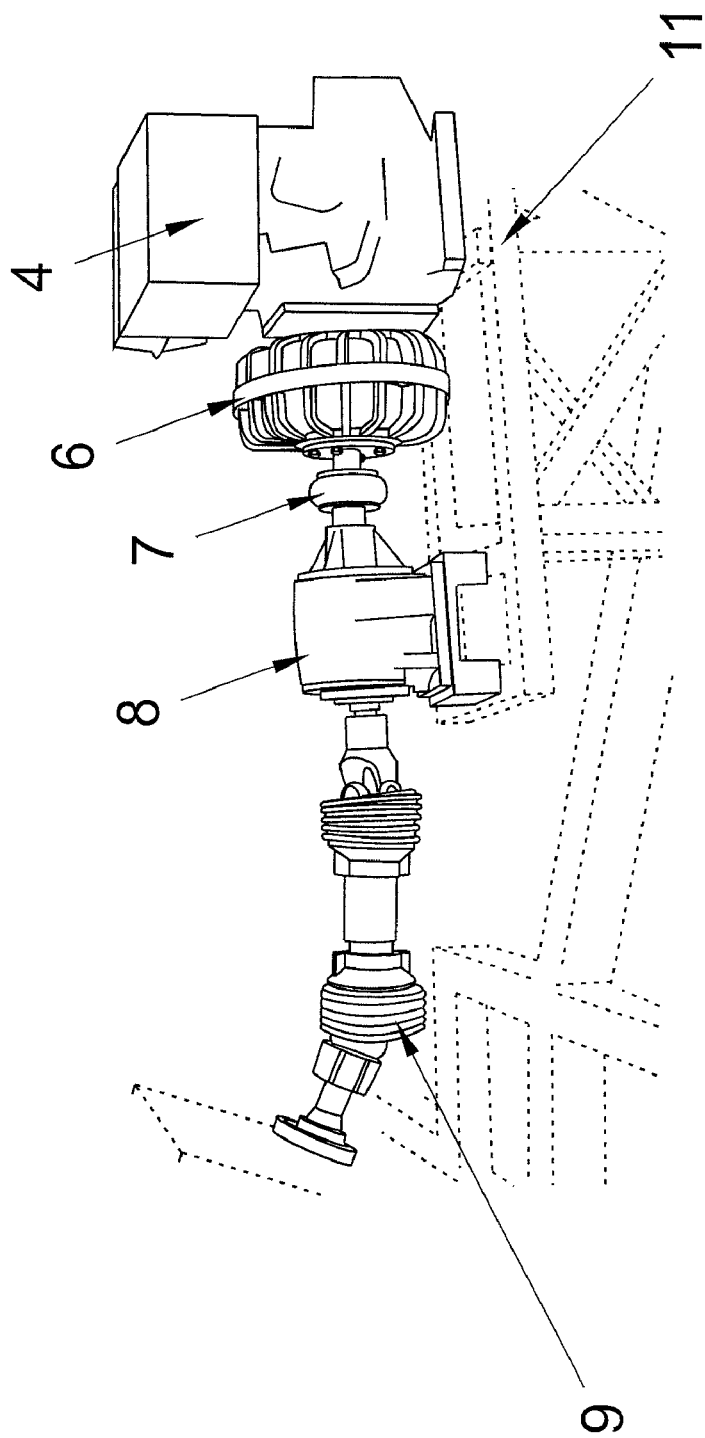
FIG. 3 illustrates a lateral view of part of the kit accessories of the present invention.

In FIGS. 2 and 3 it is illustrated in detail the engine 4 and its accessories through which movement to the loading worm gear of the buckrake is transmitted. The engine 4 is fitted to a clutch 6, preferably hydraulic and automatic, which fits to a coupling fuse 7, from there to a speed reducer 8, and from it a short cardan joint 9. The shortness of the joint offers the advantage of producing less vibration during the whole task. The above mentioned components are assembled on a base 11 which is shaped on the work spear 10.

Preferably, the bag size to be used with the kit of the present invention is of 9, 10, 11, 12 or 5½ feet.

It is important to record that the described and illustrated material is only a preferred way of execution of the present invention and it will be considered classified inside its sphere. Other execution that does not go far from the claims which are described below:

What is claimed is:

1. A self-propelled kit adapted to be used with a buckraking device or a silo-bag, wherein the buckraking device includes a movable frame having an upper section, a lower section, wheels attached to the movable frame, a top feeding reception hopper secured to the upper section of the movable frame, a filling tunnel, a load screw operatively connected to the top feeding reception hopper, a storage bag secured to the lower section and upper section of the movable frame, and a work spear, the self-propelled kit comprising:
   a movable base having one directional wheel, the directional wheel adapted to be connected to the movable frame of the buckraking device, the directional wheel comprises a central disc including a first cylindrical body on a first side of the central disc and a second cylindrical body on a second side of the central disc;
   an independent engine mounted on the movable base, wherein the independent engine is directly connected to the load screw of the buckraking device;
   a clutch mechanism coupled to the independent engine;
   a coupling fuse coupled to the clutch mechanism;
   a speed reducer coupled to the coupling fuse;
   a cardan joint coupled to the speed reducer at one end and to the top feeding reception hopper in the other end; and
   an elevated base mounted on top of the movable base, the independent engine, the clutch mechanism, the coupling, the speed reducer and the cardan joint mounted on the elevated base, the elevated base allowing the cardan joint to reach the top feeding reception hopper;
   wherein the self-propelled kit is a physically separate component from the buckraking device or the silo-bag;
   wherein the self-propelled kit is devoid of any connection to a tractor.

2. The self-propelled kit according to claim 1, wherein the independent engine is a petrol engine with 13 HP.

3. The self-propelled kit according to claim 1, wherein the clutch mechanism is hydraulic or automatic.

4. The self-propelled kit according to claim 1, wherein the movable base is shaped as a work spear.

5. The self-propelled kit according to claim 1, wherein the first and the second cylindrical bodies include wings projecting perpendicular towards a rotation surface.

6. A self-propelled kit adapted to be used with a buckraking device or a silo-bag, wherein the buckraking device includes a movable frame having an upper section, a lower section, wheels attached to the movable frame, a top feeding reception hopper secured to the upper section of the movable frame, a filling tunnel, a load screw operatively connected to the top feeding reception hopper, a storage bag secured to the lower section and upper section of the movable frame, and a work spear, the self-propelled kit consisting of:
   a movable base having one directional wheel, the directional wheel adapted to be connected to the movable frame of the buckraking device, the directional wheel comprises a central disc including a first cylindrical body on a first side of the central disc and a second cylindrical body on a second side of the central disc;
   an independent engine mounted on the movable base, wherein the independent engine is directly connected to the load screw of the buckraking device;
   a clutch mechanism coupled to the independent engine;
   a coupling fuse coupled to the clutch mechanism;
   a speed reducer coupled to the coupling fuse;
   a cardan joint coupled to the speed reducer at one end and to the top feeding reception hopper in the other end; and
   an elevated base mounted on top of the movable base, the independent engine, the clutch mechanism, the coupling, the speed reducer and the cardan joint mounted on the elevated base, the elevated base allowing the cardan joint to reach the top feeding reception hopper;
   wherein the self-propelled kit is a physically separate component from the buckraking device or the silo-bag;
   wherein the self-propelled kit is devoid of any connection to a tractor.

* * * * *